March 1, 1938.  C. W. STEVENS  2,109,654

STOPCOCK

Filed May 12, 1936

INVENTOR.
CHARLES W. STEVENS
BY Kwis, Hudson & Kent
ATTORNEYS.

Patented Mar. 1, 1938

2,109,654

UNITED STATES PATENT OFFICE 2,109,654

STOPCOCK

Charles W. Stevens, Columbus, Ohio

Application May 12, 1936, Serial No. 79,240

1 Claim. (Cl. 251—93)

This invention relates to a stop-cock valve and particularly to a stop-cock valve of the lubricating type.

An object of the invention is to provide a lubricating stop-cock valve which does not require that its size be increased over a similar valve of the non-lubricating type, wherefore a lubricating stop-cock valve can be produced for substantially the same price as a non-lubricating stop-cock valve of corresponding size or capacity.

Another object is to provide a lubricating stopcock valve wherein the fluid or liquid in the pipe line in which the valve is used cannot back up or seep through into the lubricant-containing chambers or rings when the valve is closed.

Another object is to provide a lubricating stopcock valve wherein the longitudinal grooves in the valve plug are connected to the lubricant-containing rings or chambers in the valve body only when the valve is open.

A further object is to provide a lubricating stopcock valve wherein the lubricant can be forced into the valve body through the side thereof, as distinguished from being forced into the body through the top thereof or through the valve plug.

Another object of the invention is to provide a lubricating stop-cock valve which is of simple construction and is efficient in operation.

Further and additional objects and advantages not hereinbefore specified will become apparent hereinafter during the description of an embodiment of the invention which is to follow.

Referring to the accompanying drawing illustrating the embodiment of the invention to be described herein, Fig. 1 is a side elevational view of the stopcock valve when the valve is closed;

Figure 1:
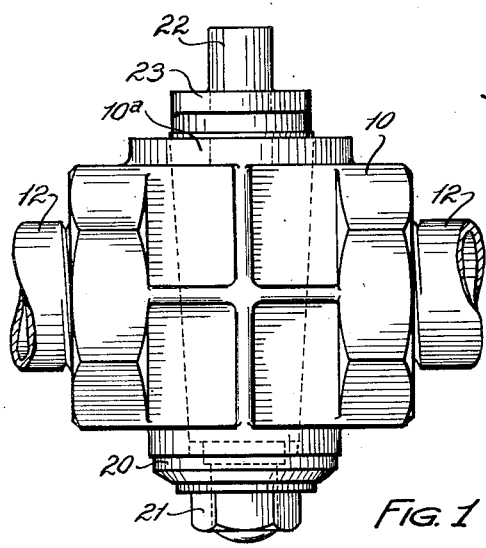
Figure 2:
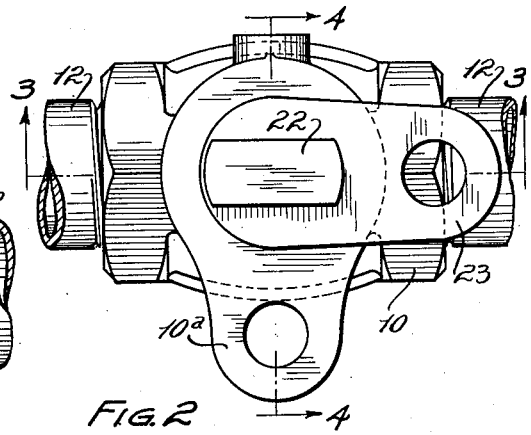
Fig. 2 is a top plan view of the valve shown in Fig. 1 but with the valve open.

The valve illustrated in the drawing comprises a body or casing 10 preferably formed of a casting and provided with a longitudinal passage 11 therethrough which is threaded adjacent its opposite ends to enable pipe sections 12 to be connected to the body or casing when the valve is mounted in a gas, water, or other line. The body 10 is provided with a tapered valve seat 13 extending transversely of the passage 11. Depressed lubricant-receiving annular chambers or rings 14 and 15 are formed in the body and are in communication with the tapered valve seat. It will be noted that the ring 14 communicates with recesses 16 arranged at diametrically opposite sides of the valve seat 13 and spaced 90° from the passage 11 through the body. The recesses 16 extend downwardly of the valve seat a short distance while one of the recesses communicates with an opening 17 formed in the body or casing and threaded to receive a suitable fitting whereby lubricant may be forced into the ring 14. The ring 15 adjacent the lower end of the valve seat communicates with a single recess 18 similar to the recesses 16 and located in vertical alignment with one of said recesses.

A tapered valve plug 19 is mounted in the valve seat 13 and held in position for turning movement therein by means of a suitable washer 20 and a nut 21 mounted on the lower end of the plug exteriorly of the body or casing, as is well understood in the art. The upper end of the valve plug 19 above the body 10 is provided with a wrenchengaging portion 22 and has an arm 23 extending outwardly from the plug and provided with an opening which, when the valve is closed, registers with an opening formed in an outwardly extending arm 10a integral with the body or casing 10, wherefore a seal can be passed through the openings, as is well understood in the art.

Figure 4:
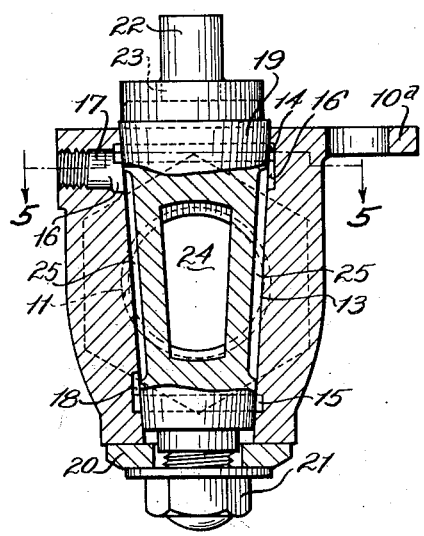
Fig. 4 is a sectional view taken substantially on line 4—4 of Fig. 2, looking in the direction of the arrows, and showing the valve open.
Figure 5:
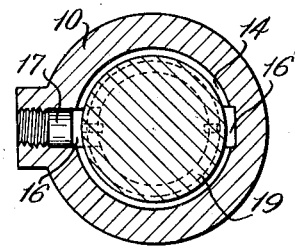
Fig. 5 is a horizontal sectional view taken substantially on the irregular line 5—5 of Fig. 4, looking in the direction of the arrows.

The valve plug is preferably hollow and is provided with diametrically opposed ports 24 which register with the passage 11 through the body when the valve is open, as will be well understood in the art. Arranged at diametrically opposite sides of the plug and midway between the ports 24 are longitudinally extending grooves 25 formed in the outer surface of the plug and of such length that they communicate with the recesses 16 and the recess 18 when the valve is open but do not communicate with the lubricant-containing rings 14 and 15 when the valve is closed. It will thus be seen by reference to Fig. 4 that when the valve is open the groove 25 at the left-hand side of the plug as viewed in said figure is in communication with both rings 14 and 15 through the recesses 16 and 18, while the groove 25 at the righthand side of the plug is in communication only with the ring 14 through the right-hand recess 16. Therefore, lubricant can enter the grooves 25 from the rings 14 and 15 at this time.

Figure 3:
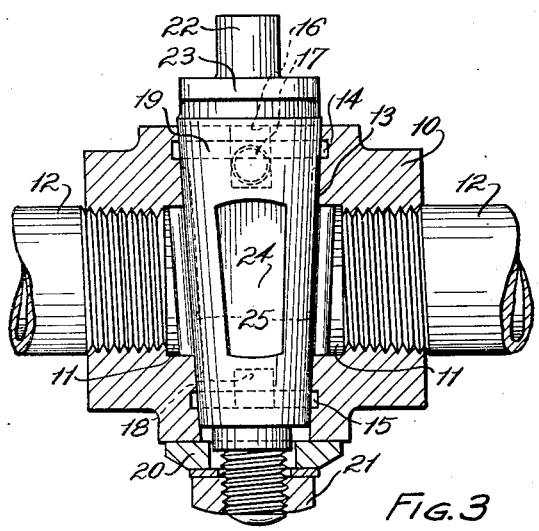
Fig. 3 is a sectional view through the stop-cock valve taken substantially on line 3—3 of Fig. 2, looking in the direction of the arrows and showing the valve closed.

When the plug 19 is turned to close the valve, that is, to the position shown in Fig. 3, the grooves 25 are out of communication with both the rings 14 and 15. It will thus be seen that lubricant can be forced into the grooves 25 to lubricate the valve only when the valve is open. It will also be noted that when the valve is closed the grooves 25 are exposed to the passage 11, but since said grooves do not communicate with the rings 14 and 15 when the valve is in this position, the gas or other fluid or liquid in the line cannot leak into the rings 14 and 15 because of interengagement between the plug and the valve seat at the ends of the grooves, wherefor the present construction eliminates the danger usually existing in lubricating stop-cock valves of gas or other fluid or liquid leaking through the lubricating grooves and into the lubricant-containing chambers or rings.

Heretofore, in lubricating stop-cock valves, it has been customary to employ at least four longitudinal grooves in the valve plug with a groove located on each side of and somewhat adjacent the diametrically opposed ports in the plug. This necessitates a larger plug and valve body in order to provide the necessary shut-off area between the ports and the grooves when the valve is closed. In the present construction, since only two diametrically opposed grooves are employed and these grooves are located midway between the diametrically opposed ports of the plug, sufficient shut-off area between the ports is provided without necessitating increasing the size of the plug or the body or casing.

Although the preferred embodiment of the invention has been illustrated and described herein, it should be understood that the invention is susceptible of various modifications and adaptations within the scope of the appended claim.

Having thus described my invention, I claim:

A lubricating stop-cock valve comprising a body provided with a passage therethrough and a tapered valve seat intersecting said passage, said body being provided adjacent the opposite ends of the valve seat with depressed lubricant-receiving rings located outside the projection of said passage and a lubricating opening connected with one of said rings, said seat being uninterrupted in the zone of said passage, said body also being provided adjacent one of the rings and in the wall of the valve seat with diametrically opposed recesses communicating with said ring and adjacent the other ring with a similar recess in communication with said ring and lying in alignment with one of said first mentioned recesses, said recesses being angularly spaced midway between the openings in the valve seat which communicate with said passage, and a tapered valve plug rotatably mounted in said valve seat and provided with diametrically opposed ports and with a pair of diametrically opposed longitudinally extending grooves located midway between said ports, said grooves being shorter in length than the distance between said rings but sufficiently long to register with said recesses only when said valve is substantially fully open, and will be out of communication with said rings in all other positions of said valve plug.

CHARLES W. STEVENS.